(12) United States Patent
Ferreira Peralta et al.

(10) Patent No.: US 12,104,385 B2
(45) Date of Patent: Oct. 1, 2024

(54) FLAME RETARDANT BUILDING CONSTRUCTION MATERIAL AND PROCESS

(71) Applicant: POLYGLASS S.p.A., Ponte di Piave (IT)

(72) Inventors: Elvira Joana Ferreira Peralta, Deerfield Beach, FL (US); Betiana Andrea Acha, Deerfield Beach, FL (US); Khoa Dang, Deerfield Beach, FL (US); Marco Yoshua Sieber, Deerfield Beach, FL (US); Louis Lynn Grube, Deerfield Beach, FL (US)

(73) Assignee: POLYGLASS S.p.A., Ponte di Piave (IT)

( * ) Notice: Subject to any disclaimer, the term of this patent is extended or adjusted under 35 U.S.C. 154(b) by 598 days.

(21) Appl. No.: 17/245,106

(22) Filed: Apr. 30, 2021

(65) Prior Publication Data
US 2021/0340768 A1    Nov. 4, 2021

Related U.S. Application Data

(60) Provisional application No. 63/017,883, filed on Apr. 30, 2020.

(51) Int. Cl.
*B32B 11/02* (2006.01)
*B32B 7/027* (2019.01)
(Continued)

(52) U.S. Cl.
CPC ............... *E04D 5/10* (2013.01); *B32B 7/027* (2019.01); *B32B 11/02* (2013.01); *B32B 11/10* (2013.01);
(Continued)

(58) Field of Classification Search
CPC ....... B32B 11/02; B32B 11/046; B32B 11/06; B32B 11/10; B32B 2037/243; B32B 2250/05; B32B 2255/20; B32B 2260/021; B32B 2260/025; B32B 2260/042; B32B 2260/046; B32B 2262/0253; B32B 2262/0261; B32B 2262/0276; B32B 2262/101; B32B 2262/14; B32B 2264/10; B32B 2264/12; B32B 2307/3065; B32B 2307/732; B32B 2419/04; B32B 2419/06; B32B 25/06; B32B 25/08; B32B 25/10; B32B 2607/00; B32B 27/08; B32B 27/10;
(Continued)

(56) References Cited

U.S. PATENT DOCUMENTS 4,659,381 A   4/1987 Walters
4,804,696 A   2/1989 Jolitz et al.
(Continued)

*Primary Examiner* — Lawrence D Ferguson
(74) *Attorney, Agent, or Firm* — Rothwell, Figg, Ernst & Manbeck, P.C.

(57) ABSTRACT

Disclosed is a building and construction material and process including multiple layers and vermiculite ore in at least one layer. A substrate layer may have one or more layers on top or on the bottom of it. Numerous compounds may be used in one or more of the layers including asphaltic compound, polymer modified asphalt compound, thermoplastic polymer compound and others. The layers may also include synergistic flame retardant and fillers. And disclosed is a process to manufacture the building and construction material.

30 Claims, 27 Drawing Sheets

(51) Int. Cl.
  *B32B 11/10* (2006.01)
  *B32B 37/00* (2006.01)
  *B32B 37/24* (2006.01)
  *E04D 5/10* (2006.01)

(52) U.S. Cl.
  CPC ............ *B32B 37/156* (2013.01); *B32B 37/24* (2013.01); *B32B 2037/243* (2013.01); *B32B 2255/20* (2013.01); *B32B 2260/046* (2013.01); *B32B 2262/101* (2013.01); *B32B 2264/10* (2013.01); *B32B 2264/12* (2013.01); *B32B 2307/3065* (2013.01); *B32B 2419/06* (2013.01)

(58) Field of Classification Search
  CPC ......... B32B 27/12; B32B 27/14; B32B 29/04; B32B 37/156; B32B 37/24; B32B 5/022; B32B 5/024; B32B 5/028; B32B 5/08; B32B 5/16; B32B 5/30; B32B 7/027; E04D 12/002; E04D 5/06; E04D 5/10
  See application file for complete search history.

(56) References Cited

U.S. PATENT DOCUMENTS

| | | |
|---|---|---|
| 5,055,135 A | 10/1991 | Grube et al. |
| 5,347,785 A * | 9/1994 | Terrenzio ............... E04D 1/26 52/555 |
| 5,437,923 A | 8/1995 | Kalkanoglu |
| 5,462,588 A | 10/1995 | Walters et al. |
| 2006/0273290 A1 | 12/2006 | Khan et al. |

\* cited by examiner

FLAME RETARDANT BUILDING CONSTRUCTION MATERIAL AND PROCESS

CROSS-REFERENCE TO RELATED APPLICATION

The present application claims priority to U.S. Provisional Patent Application Ser. No. 63/017,883 filed Apr. 30, 2020 which is hereby incorporated herein by reference in entirety for all purposes.

FIELD OF THE INVENTION

Disclosed embodiments are directed toward thermoplastic, elastomeric, asphaltic, and or modified bitumen flame or fire resistant building construction materials that contain vermiculite ore used as a fire retardant additive. These fire-retardant building construction materials are useful as underlayments, as roofing or siding single ply or multiply cap pieces, sheets and membranes, as ply sheets and membranes, as base sheets and membranes, as below grade and waterproofing sheets and membranes and as barrier sheets and membranes that include air, vapor, sound, water, and moisture barriers.

BACKGROUND OF THE INVENTION

Polymeric as well as polymer modified asphaltic building construction materials, often referred to as modified bitumen shingles and or membranes, as well as asphaltic shingles and or membranes that are not modified with polymers are widely used in the building construction industry today. Thermoplastic, elastomeric, asphaltic, and modified bitumen building construction materials are used in waterproofing residential steep sloped roofs and buildings as well as commercial low sloped roofs and buildings above and below ground.

These roofing and waterproofing systems may include one or more layers of thermoplastic, elastomeric, asphaltic and or modified bitumen building construction materials used as shingles, cap sheets and/or membranes, ply sheets and/or membranes, base sheets and/or membranes, underlayments, vapor barriers, sound barriers, moisture barriers, air barriers, water barriers, and the like. These thermoplastic, elastomeric, asphaltic and/or modified bitumen or polymer modified asphalt building construction materials can also be used as siding materials, beneath floors, on ceilings and walls either horizontally and/or on vertical surfaces such as inside walls, outside walls, parapet walls, basements and the like and on the building envelope wherever water proofing, air barriers, vapor barriers, moisture barriers, sound barriers and the like are needed.

Modified bitumen building construction materials are also known as membranes in the industry, are typically classified into two major groups, "plastomeric" and "elastomeric" membranes depending on what polymers are used to modify the asphalt. These membranes can also be made of combinations of compounds that may contain unmodified asphalt, plastomeric modified bitumen compound and/or elastomeric modified bitumen compound or both plastomeric, and elastomeric modified bitumen compounds.

Plastomeric modified bitumen membranes are manufactured using bitumen (asphalt) that is modified with one or more thermoplastic polymers such as Atactic Polypropylene (APP), Amorphous Poly Alpha Olefin (APAO), Thermoplastic Polyolefin (TPO), Low Density Polyethylene (LDPE), High Density Polypropylene (HDPE), Polyethylene (PE), Isotactic polypropylene (IPP), and the like.

Elastomeric modified bitumen membranes that are primarily modified with elastomeric polymers like Styrene Butadiene Styrene (SBS), Styrene Isoprene Styrene (SIS) and the like. The modifiers change the properties of the asphalt and or bitumen to increase its utility as a construction, building and or roofing material, e.g., to make it more elastic, have greater flexibility at low temperatures, have greater heat resistance at high temperatures, have better resistance to softening and flow and have less deformation from mechanical forces, to name a few.

These building construction materials usually comprise a substrate typically made of polyester, glass reinforced polyester, fiberglass mat, scrims and the like alone or in combinations thereof to impart strength, tear resistance and impact resistance from hail and the like. Fiberglass based substrates offer some fire resistant properties particularly to burning brands and the like from fire penetrating through the fiberglass based building construction material down to the building deck particularly when multiple layers of membranes or shingles are used on the building surface.

The substrate is typically used as a carrier sheet to facilitate the manufacturing of building construction materials through the production line. Typically these substrates or carriers are embedded in the compound so that there is an upper or top compound layer above the substrate and a lower or bottom compound layer below the substrate. These substrates can be pre-saturated with asphalt, modified bitumen, thermoplastic compounds, elastomeric compounds, or similar compounds before having one or more layers of compound being applied onto the substrate. At times the substrate or carrier is used as a top surface layer alone or in combination with another substrate in building construction materials or as a bottom surface layer in building construction materials with or without an additional substrate.

The top compound layer(s) and/or the bottom compound layer(s) applied to these substrates can be asphaltic, plastomeric and/or elastomeric modified bitumen, thermoplastic compounds, elastomeric compounds or combinations thereof. For example plastomeric compound can be applied as part of or the entire top compound layer as well as part of or the entire bottom compound layer using a substrate that is pre-saturated or applied to a non-pre-saturated substrate so that the plastomeric (APP) modified compound layer(s) saturate the substrate during production or bonds to the pre-saturated substrate. Additional compound(s) can be added to the top compound layer and/or bottom compound layer as desired.

Plastomeric modified bitumen based materials are usually installed by heat welding techniques using a propane torch, hot air or the like where a heat source is used to melt the APP modified bitumen material on the bottom of the overlaying membrane and the top of subsequent underlying rolls where they overlap, to adhere the material together to form heat welded seams for good attachment and bond strength. These membranes are typically used alone or in combination with other asphaltic and/or modified bitumen membranes.

In another example, elastomeric compound can be applied as part of or the entire top compound layer as well as part of or the entire bottom compound layer using a substrate that is pre-saturated or applied to a non-pre-saturated substrate so that so that the elastomeric (SBS) modified compound layer saturates the substrate during production or bonds to the pre-saturated substrate. Additional compound(s) can be added to the top compound layer and/or bottom compound layer as desired. These elastomeric membranes are typically applied using hot molten asphalt, cold applied adhesives or by a torch or heat source that melts and or softens the elastomeric compound so that it fuses to the structure and to itself when it is overlapped at the seams.

In another example, asphaltic, elastomeric and/or plastomeric compound can be applied as one or more top compound layers to a pre-saturated substrate or applied as one or more compound layers to a non-pre-saturated substrate so that the compound saturates the substrate during production or bonds to the pre-saturated substrate. Additionally, a self-adhering material like a tacky elastomeric self-adhering compound for example, is applied as part of or the entire bottom compound layer of the membrane so that the self-adhering compound is the bottom most compound layer of the building construction material so that it can bond to the structure and to itself when overlapped or adhered at the seams. These building construction materials or membranes typically use one or more silicon treated release liners as the bottom surfacing to cover the self-adhered compound to prevent the material from sticking during manufacturing, storage and shipping. The release liner is typically removed prior to installation of the material.

In another example, self-adhered elastomeric compound can be applied as part of or as the entire top compound layer as well as in part of or the entire bottom compound layer to a pre-saturated substrate or applied to a non-pre-saturated substrate so that the self-adhered elastomeric modified compound or the like, saturates the substrate during production or bonds to the pre-saturated substrate. The self-adhering material is usually used as the bottom most compound layer so that it can bond to the structure and to itself when overlapped or adhered at the seams. These membranes typically use silicon treated release liner(s) over the tacky self-adhered elastomeric compound to prevent sticking during manufacturing, storage and shipping and is typically removed prior to installation of the material.

It should be noted that not all substrates are sandwiched between modified bitumen compounds. Some substrates can be used as the top or upper surface to facilitate bonding of low rise polyisocyanurate foam and the like for use as an underlayment under tile or similar materials for example. Some polyester based substrates or the like, are often used for this purpose. These materials may have resistance to the elements, like ultraviolet and heat resistance for example, to maintain their integrity when exposed to the weather prior to the installation of the tiles or the like.

For example the polyester mat or similar substrate can be coated on the bottom surface in one or more steps leaving the substrate as the upper or top surfacing. The compound below the substrate can be one or more layers of asphaltic, plastomeric and/or elastomeric compound used alone or in combinations thereof. Typically these membranes will have a tacky self-adhered compound as the bottom most compound layer so that it can bond to the structure and to itself when overlapped or adhered at the seams. These membranes typically use silicon treated release liner(s) over the tacky self-adhered elastomeric compound to prevent sticking during manufacturing, storage and shipping. The release liner is typically removed prior to installation of the material.

Typically cap sheet membranes are finished on the top surface with granules or the like of various colors to help protect the material and add an aesthetically pleasing look to the roofing, waterproofing, or siding material. The granules are usually placed and partially embedded in the top or upper compound layer. These granules are typically used in the weathering or exposed area of the material. In most cases the granules do not cover the entire top surface of the material as there is a need at times to leave an uncovered area called the side lap in order to adhere the overlying membrane course to the underlying membrane course together.

Granules can be used in between layers of compound, in non-exposed weathering areas or even as a bottom surfacing layer depending on the desired end use of the building construction material. There are many examples of building construction materials that use granules this way. Shingles use granules in the head lap area that is covered during application, venting base sheet membranes use granules as the bottom surfacing layer and still other shingle products use granules between layers of asphaltic compound to add thickness to the material to name a few.

Sometimes granules can be left off entirely from the building construction material. One example of this is called a smooth plastomeric membrane that can be used as a cap or ply sheet. Plastomeric or APP compound is inherently ultraviolet (UV) resistant since the polymers used to modify the asphalt or bitumen typically do not contain double bonds that can cleave when exposed to UV conditions. These "smooth" plastomeric membranes often employ sand, talc, mica or the like as the top surfacing. Typically these smooth plastomeric membranes often use a polymeric film as a back or bottom surfacing although sand, talc, mica, and the like can be used to prevent sticking during manufacturing, storage, and transportation.

Base sheet membranes, ply sheets, underlayments, vapor, air, moisture, and sound barriers often employ a polymeric film to the top or upper layer although other surfacings can be used such as sand, talc, mica, and the like to prevent sticking during manufacturing, storage, and transportation. Also the bottom or lower layer of the membranes often use polymeric films, silicon treated release liners, sand, talc, mica and the like depending on the building construction material's composition and the intended use and application methods of these membranes.

In order to meet certain fire resistance classifications and properties, which may be required by code or specification, fire, ember or flame resistant membranes like cap sheets and/or ply sheets and/or base sheets and/or underlayment sheets alone or in combination may be used for this purpose. The use of fire retardant materials in the construction industry that pass and achieve an Underwriters Laboratory (UL) 790 Class A fire rating allows the home owner and/or building owner an added sense of security for their investment.

The UL 790 tests includes multiple test decks tested by Spread of Flame, Intermittent Flame, and Burning Brand testing. The fire resistant building construction materials and/or membranes or membrane systems must pass each and every test using multiple test decks in each category in order to achieve the UL 790 fire classification or rating. These fire resistant membranes help to slow down the spread of flames and help reduce the chance that the interior of the building will catch on fire if a piece of burning wood or brand falls on the roof of the building. A UL 790 Class A rating is the highest rating obtainable at Underwriters Laboratory.

Often fire resistant minerals or chemicals are used in the compound to enhance the fire retardant properties of these building construction materials or membranes. These minerals and or chemicals are expensive, may not be environmentally friendly, and may cause long term health issues if proper precautions are not taken.

These minerals include Aluminum Trihydrate, Magnesium Hydroxide, Colemanite, Graphite, Borax, Zinc Borate, Boric acid, Antimony Oxide, Zinc Hydroxystannate, and Zinc Stannate to name a few, used alone or in combination with each other or in combination with chemicals and/or with inert mineral fillers like calcium carbonate, talc, sand, ground stone dust, and or asbestos to name a few.

One class of chemical flame retardants are referred to as halogens that include bromine, chlorine, fluorine, and iodine. Halogenated flame retardants act directly on the flame, the core of the fire. They work by interfering with the chemistry of the flame. Chlorinated and brominated chemicals are both used in this role, but brominated flame retardants overall are the most effective. Other chemicals used as flame retardants include compounds that contain ammonia, phosphorous, nitrogen, and sulfur to name a few used alone or in combination with other chemical flame retardant chemical and/or minerals.

The use of brominated fire retardants in Europe is effectively coming to a close through pan-EU (European Union) legislation such as REACH (Registration, Evaluation, Authorization, and Restriction of Chemicals) and RoHS (Restriction of Hazardous Substances). In the United States for example, some states have banned the use of Halogenated flame retardants altogether, but other states continue to permit them.

A few pertinent patents for flame retardant building construction materials that use these various types of chemicals and minerals alone and in combination with other minerals and or chemicals with or without inert fillers are listed below as examples related to the disclosed subject matter.

Walters, in U.S. Pat. No. 4,659,381 discloses a flame retarded asphalt composition comprising a blend of modified bitumen, 1-20 wt. % of at least one halogenated flame retardant, and 1-5 wt. % of at least one inorganic phosphorus containing compound selected from the group consisting of ammonium phosphate compounds and red phosphorus.

Jolitz et al., in U.S. Pat. No. 4,804,696 discloses a plastomeric modified bitumen fire retardant asphalt composition that comprises about 40-60 wt. % asphalt, about 1-20 wt. % thermoplastic, about 30-40 wt. % flame retarding agent. The flame retarding agent comprises about 65-80 wt. % monoammonium phosphate, about 5-15 wt. % ammonium sulfate, and about 1 wt. % silicone polymer.

Grube et al., in U.S. Pat. No. 5,055,135 discloses a halogen free alternative for a flame retardant elastomeric modified bitumen compound for roofing mat or sheeting impregnated with a composition comprising, a co-polymeric styrene modified asphalt and a critical amount of between 35 and about 50 wt. % of Colemanite. The invention also relates to the novel flame retardant composition which can be employed for treating roofing reinforcement and building siding material.

Kalkanoglu, in U.S. Pat. No. 5,437,923 discloses a halogen-free flame retardant plastomeric modified bitumen composition with improved performance that contains at least 45 wt. % bitumen, about 2 to 25 wt. % thermoplastic polymer, and about 15 to 35 wt. % of a mixture of flame retardant compounds that comprises alumina trihydrate and/or magnesium hydroxide, at least 2 wt. % zinc borate, and, optionally, about 2 to 20 wt. % calcium carbonate of the final flame-retardant bitumen composition.

Walters et al., in U.S. Pat. No. 5,462,588 discloses a modified bitumen flame retarded asphalt composition comprising bitumen, a thermoplastic elastomer, 20-30 wt. % of an inert filler, from 1 to 20 wt. % of a halogenated flame retardant, and from 0.5 to 10 wt. % of a nitrogen heterocyclic composition having at least six ring members and containing at least three nitrogen atoms.

Khan et al., in US Patent No. 20060273290A1 discloses a fire retardant composition, comprising: a primer solution containing expandable graphite particles; triethyl phosphate; and aluminum trihydrate, wherein the triethyl phosphate comprises from about 1 wt. % to about 15 wt. % based on the weight of the composition.

What is needed is a safe, economical alternative to the fire retardant minerals and chemicals used in manufacturing plastomeric and elastomeric modified bitumen materials today. These minerals and chemicals are often dispersed in both the top compound and the bottom compound in order to pass and be granted a UL 790 Class A rating at a particular slope. These minerals and/or chemicals are often added during the mixing process prior to coating these compounds onto a substrate.

Typically, the higher the slope of the test decks the harder it is to pass and achieve a UL Class A fire rating. What is needed is a way to reduce the amount of the expensive flame retardants being added to the membrane or preferably by only adding the flame retardant minerals and/or chemicals to the top and or bottom compound to reduce costs in order to pass and achieve a UL 790 Class A fire rating.

To achieve both moisture, air or vapor resistance and achieve flame or fire resistance of roofing systems used in the market today use of multiple membranes are often utilized. Sometimes multiple flame resistance membranes are used together or in combination with non-flame resistant membranes. The use of multiple membranes is costly and labor intensive. A solution is needed to reduce the number of flame retardant membrane layers and or reduce the flame retardant to a single layer of compound in the membranes used to reduce the overall cost of the roofing system.

This is particularly true underneath metal roofing systems. Often the first membrane used in a metal roofing system is typically a moisture, air or vapor barrier adhered to the roofing deck. The next membrane used is often a fire resistant membrane and is placed and adhered on top of the barrier layer to achieve the fire rating classification needed by code or specification. A solution is needed where a single membrane underneath the metal roof panels that can be used for both a vapor, air, or moisture barrier and still pass and achieve a Class A fire rating as tested by UL 790 fire tests.

SUMMARY

This invention is based on the use of vermiculite ore used alone or in combination with synergistic flame retardant(s) added to one or more layers for an improved flame retardant building construction material.

The use of vermiculite ore incorporated into thermoplastic and/or elastomeric compounds and membranes, asphaltic compounds and membranes, and particularly into modified bitumen compounds to manufacture flame retardant building construction materials is surprisingly a novel idea.

This may be in part due to the larger particle size of the vermiculite ore compared to other mineral flame retardants like Colemanite, Aluminum Trihydrate, Magnesium Hydroxide, and expandable graphite to name a few and mineral fillers like limestone and sand for example. This larger particle size can cause a high viscosity of the plastomeric, elastomeric, asphaltic and/or modified bitumen compounds after the vermiculite ore has been added to and incorporated into these compounds prior to manufacturing the flame retardant building construction material.

High viscosity compounds are difficult to pump and transfer to the manufacturing line. Also the high viscosity compound may be hard to process on the manufacturing line if it is successfully pumped and transferred to the manufacturing line. These manufacturing processing issues may include poor saturation of the substrate, substrate breaks during manufacturing particularly if a glass substrate is used, surface defects, and dimensional stability issues of the finished product to name a few.

Also vermiculite ore has water associated with it as well as water trapped between the multiple layers of the ore. This water can evaporate during addition to hot compounds like asphalt and or modified bitumen compounds that could cause the hot asphalt to expand rapidly releasing steam that can cause the mixing tank or vessel to overflow which may cause possible injury or at the least additional mix times to remove the unwanted water and or trapped steam in the asphalt or modified bitumen compound.

Several manufacturing methods of incorporating vermiculite ore into various thermoplastic, elastomeric, asphaltic and or modified bitumen compounds prior to and during the manufacturing process has been discovered to overcome these issues.

DRAWING NUMBERS

Figure 1:
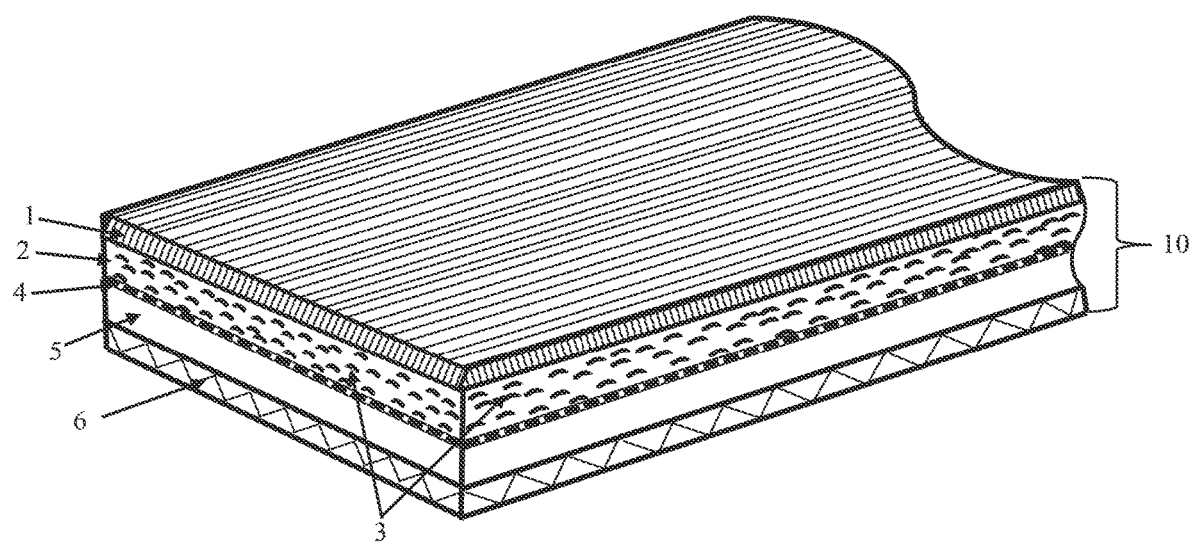
FIG. 1 is a perspective view of a preferred flame retardant building construction material 10 with vermiculite ore 3, used in top compound layer 2, top surfacing 1 applied to top compound layer 2, substrate 4, bottom compound layer 5 and bottom surfacing 6 applied to bottom compound layer 5.

1 Top surfacing
2 Top compound layer
3 Vermiculite ore
4 Substrate
5 Bottom compound layer
6 Bottom surfacing
7 Side lap area
8 Side lap surfacing
9 Synergistic flame retardant(s)
10 Flame retardant building construction material

DETAILED DESCRIPTION

Figure 2:
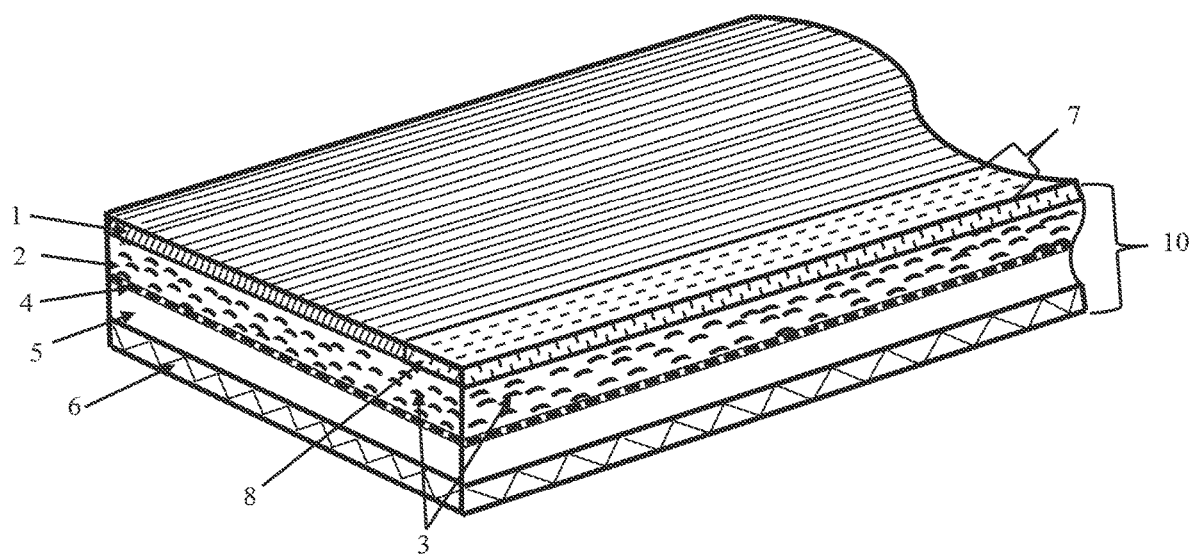
FIG. 2 is a perspective view of a second preferred flame retardant building construction material 10 with vermiculite ore 3 used in top compound layer 2, side lap area 7, top surfacing 1 and side lap surfacing 8 applied to top compound layer 2, substrate 4, bottom compound layer 5 and bottom surfacing 6 applied to bottom compound layer 5.

In one or more embodiments, flame retardant building construction material 10 comprises layers of thermoplastic compound, elastomeric compound, asphaltic compounds, and/or asphalt with plastomeric and/or elastomeric polymers or both to make modified bitumen based compounds as desired. Vermiculite ore 3 is incorporated in top compound layer 2 as shown in FIG. 1 and FIG. 2 that is located above substrate 4.

In one or more embodiments, top compound layer 2 consists of thermoplastic compound, elastomeric compound, asphaltic compound, and/or modified bitumen compound. Top compound layer 2 may consist of one or more layers of thermoplastic, elastomeric, asphaltic, and or modified bitumen compound. Vermiculite ore 3 and or synergistic flame retardant(s) 9 can be incorporated into one or more of these layers as desired prior to application of top compound layer 2 on substrate 4 before being applied on the manufacturing line or vermiculite ore 3 can be incorporated into one or more layers of top compound layer 2 on the manufacturing line during the manufacturing process. Top compound layer 2 may also include plasticizers, oils, tackifiers, etc., and inorganic fillers like limestone, sand, ground stone dust and the like.

In one or more embodiments, substrate 4 is located between top compound layer 2 and bottom compound layer 5 as seen in FIGS. 1-26. Substrate 4 can also be used as top surfacing 1 and/or bottom surfacing 6 as desired. Substrate 4 is typically a mat, fabric sheet, or scrim comprising woven and/or non-woven fibers or filaments comprising of polyester, glass, nylon, polypropylene, and the like, used alone and or in combinations thereof. These substrates impart strength and enhanced properties and carry the flame retardant building construction material through the production line. The enhanced properties include improved tear strength, elongation, and resistance to punctures and to tears to name a few.

In one or more embodiments, substrate 4 can be pre-saturated with asphalt, modified bitumen and the like in one or more steps prior to application of top compound layer 2 and or bottom compound layer 5. Vermiculite ore 3 can be applied to saturated substrate 4 before top compound layer 2 and/or bottom compound layer 5 is applied on the production line in one or more layers as desired. Alternately, substrate 4 can be saturated with top compound and or bottom compound during the manufacturing process on the production line. Sometimes Substrate 4 is used as top surfacing 1 and one or more thermoplastic, elastomeric, asphaltic and or modified bitumen compound layers are used for bottom compound 5 to make flame retardant building construction material 10.

In one or more embodiments, optional top surfacing 1 located on top compound layer 2 covers essentially the entire area of top compound layer 2 as seen in FIGS. 1, 3, 5, 7, 9, 11, 13, 15, 17, 19, 21, 23, and 25. Top surfacing 1 when in use typically comprises a polymeric film, nonwoven and/or woven fabric sheeting, roofing granules, sand, talc, mica and the like, or it can comprise an exposed substrate partially embedded into top compound layer 2. Alternately, top surfacing 1 can comprise vermiculite ore 3 used alone and/or in combination with other surfacings. Typically there are markings located on the surface of top surfacing 1 that are used to show the installer where the recommended overlap area should be depending on type of installation. These markings can be printed on a polymeric film for example, prior to the polymeric film being applied on the production line or can be added to top surfacing 1 in a separate step on the production line during the manufacturing process as desired.

In one or more embodiments, bottom compound layer 5 consists of one or more layers of thermoplastic compound, elastomeric compound, asphalt based compound or asphalt modified with plastomeric and/or elastomeric polymers or both and may include plasticizers, oils, tackifiers, etc., and inorganic fillers like limestone, sand, ground stone dust and the like. Bottom compound layer 5 may consist of one or more layers of asphalt and or modified bitumen compound or both. One or more layers of bottom compound 5 may also be a self-adhered or self-sealing compound for use in what is commonly called in the industry as self-adhered, peel and stick, and or thermally activated applications.

In one or more embodiments, top compound layer 2 and bottom compound layer 5 may comprise the same compound, i.e. asphaltic, plastomeric and/or elastomeric compound, or top compound layer 2 and bottom compound layer 5 may be entirely different compounds. Also one or more layers of thermoplastic, elastomeric, asphalt and or modified bitumen compound or both can comprise top compound layer 2 and/or bottom compound layer 5. Vermiculite ore 3 and/or synergistic flame retardant(s) 9 can be used as desired in one or more of these compound layers as seen in FIG. 25 and FIG. 26 as non-limiting examples.

Figure 24:
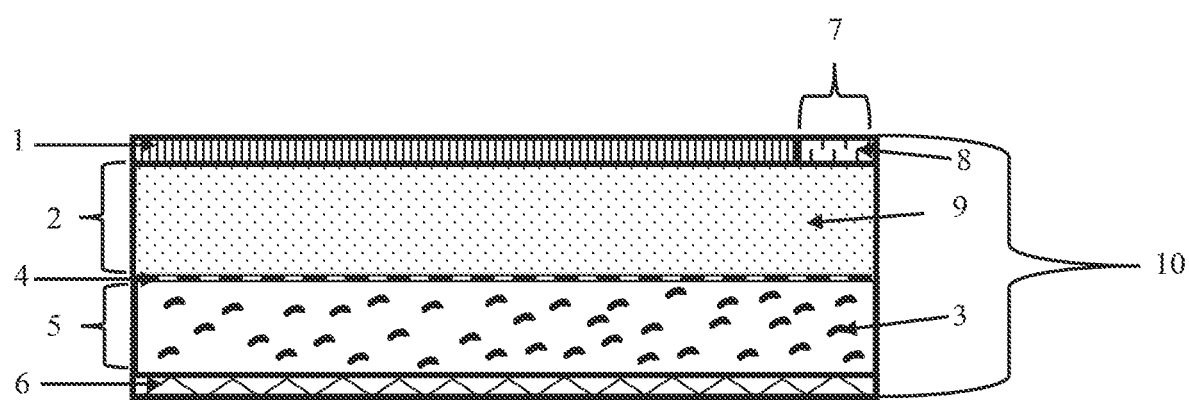
FIG. 24 is a cross sectional view example of flame retardant building construction material 10 with synergistic flame retardant(s) 9 used in the top compound layer 2, side lap area 7, top surfacing 1 and side lap surfacing 8 applied to top compound layer 2, substrate 4, bottom compound layer 5 with vermiculite ore 3, and bottom surfacing 6 applied to the bottom compound layer 5.
Figure 25:
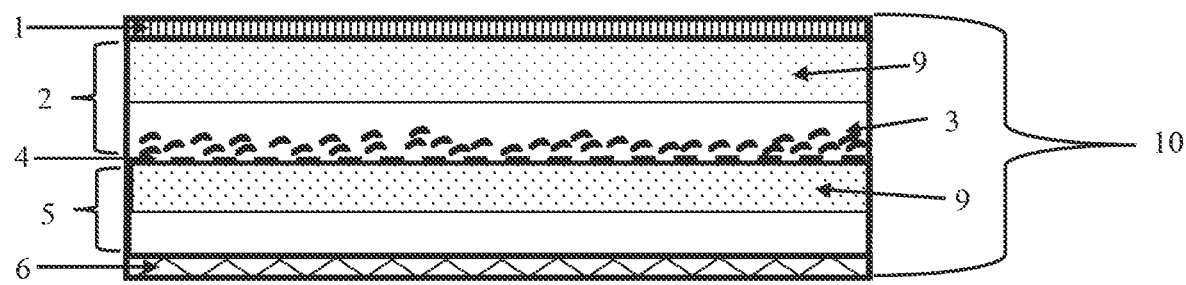
FIG. 25 is a non-limiting cross sectional view example of flame retardant building construction material 10 with top compound layer 2 comprising of two compound layers, the uppermost layer compound uses optional synergistic flame retardant(s) 9 and the other layer of compound incorporates vermiculite ore 9 that was dropped or deposited onto substrate 4 before or after it saturated with compound like asphalt and or modified bitumen compound in one or more steps for example, top surfacing 1 applied to top compound layer 2, bottom compound layer 5 comprising also of two layers of compound so that one layer uses optional synergistic flame retardant(s) 9 and the bottom most layer of compound is without any added flame retardants, with bottom surfacing 6 applied to bottom compound layer 5.
Figure 26:
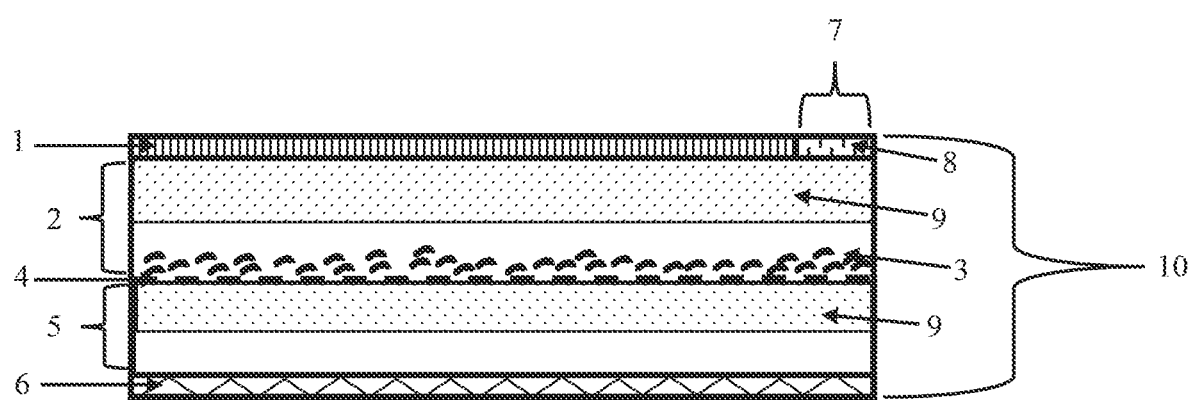
FIG. 26 is a non-limiting cross sectional view example of a flame retardant building construction material 10 with side lap area 7, top compound layer 2 comprising of two compound layers, the uppermost layer compound uses optional synergistic flame retardant(s) 9 and the other layer of compound incorporates vermiculite ore 9 that was dropped and or deposited onto substrate 4 before or after it was saturated with compound like asphalt and or modified bitumen compound for example, in one or more steps, top surfacing 1 and side lap surfacing 8 applied to top compound layer 2, bottom compound layer 5 comprising also of two layers of compound so that one layer uses synergistic flame retardant(s) 9 and the bottom most layer of compound is without any added flame retardants, with bottom surfacing 6 applied to bottom compound layer 5.
Figure 27:
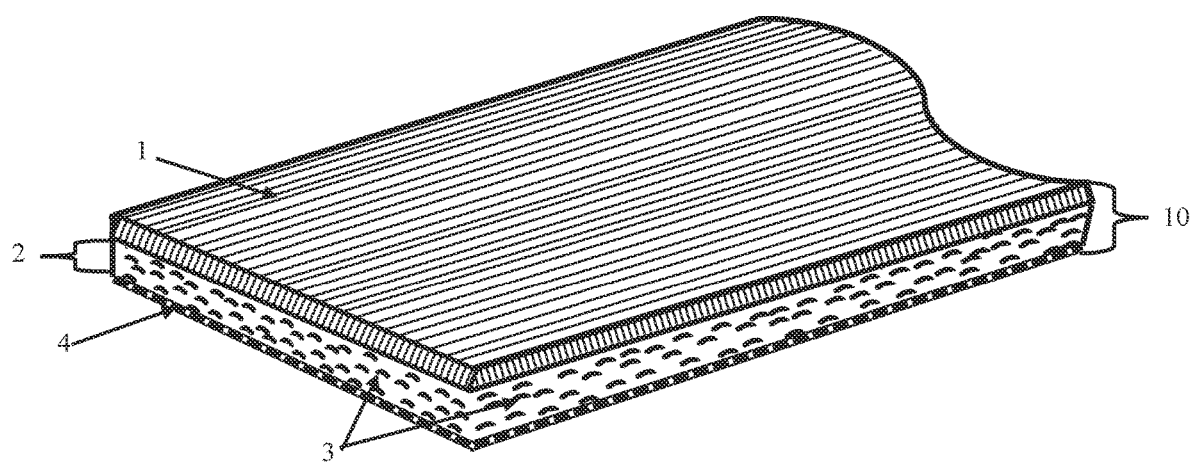
FIG. 27 is a perspective view of a preferred flame retardant building construction material 10 with vermiculite ore 3, used in top compound layer 2, with optional top surfacing 1 applied to top compound layer 2 on top of substrate 4.

It should be noted that the compound layers that comprise top compound layer 2 and the compound layers that comprise bottom compound layer 5 in FIG. 25 and FIG. 26 are only one of many combinations of compounds that can be used to manufacture flame retardant building construction material 10. The compound layer or layers used to construct top compound layer 2 and the compound layer or layers used to construct bottom compound layer 5 can comprise of one, two, three, four, or more compounds each. These thermoplastic, elastomeric, asphaltic and or modified bitumen compound layers as previously described can be used with or without vermiculite ore 3 and/or synergistic flame retardant(s) 9 as one or more of these compound layers not only in FIG. 25 and FIG. 26 but also in FIGS. 1-26 as desired.

In one or more embodiments, bottom surfacing 6 located below bottom compound layer 5 as seen in FIGS. 1-26 may comprise a polymeric film with or without a release agent like silicone, a paper release liner treated with a release agent like silicone, nonwoven and/or woven fabric sheeting, an exposed substrate partially embedded into bottom compound layer 5, roofing granules, sand, talc, mica and the like. Alternately, bottom surfacing 6 can comprise vermiculite ore 3 used alone and/or in combination with other surfacings.

In one or more embodiments, flame retardant building construction material 10 incorporates a side lap area 7 with side lap surfacing 8 located on top of side lap area 7 adjacent to top surfacing 1 on top compound layer 2 as seen in FIGS. 2, 4, 6, 8, 10, 12, 14, 16, 18, 20, 22, 24 and 26.

Side lap area 7 is about 2-5 inches in width and typically runs along the edge of flame retardant building construction material 10. Side lap area 7 is intended to be an area essentially free from top surfacing 1 and is an area designated by the manufacturer for adhering together the overlying flame retardant building construction material to the underlying flame retardant building construction material.

In one or more embodiments, side lap surfacing 8 can comprise a polymeric film with or without a release agent like silicone, a paper release liner treated with a release agent like silicone, an exposed second substrate partially embedded into top compound layer 2, sand, talc, mica and the like.

Figure 5:
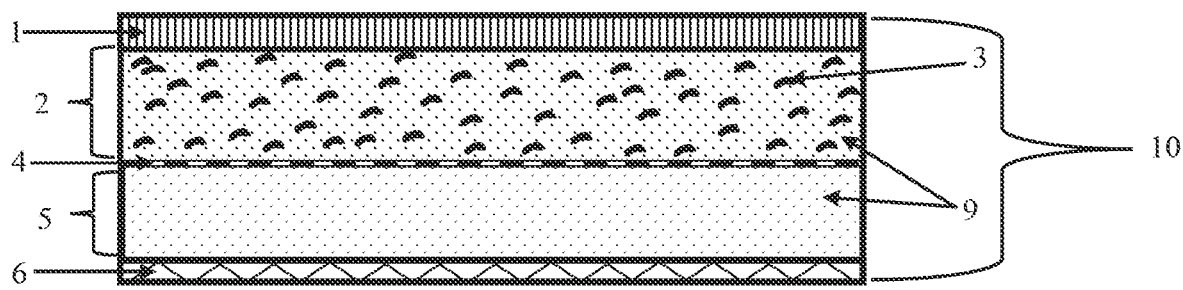
FIG. 5 is a cross sectional view example of flame retardant building construction material with vermiculite ore 3 with synergistic flame retardant(s) 9 used in the top compound layer 2, top surfacing 1 applied to top compound layer 2, substrate 4, bottom compound layer 5 with added synergistic flame retardant(s) 9 and bottom surfacing 6 applied to the bottom compound layer 5.
Figure 6:
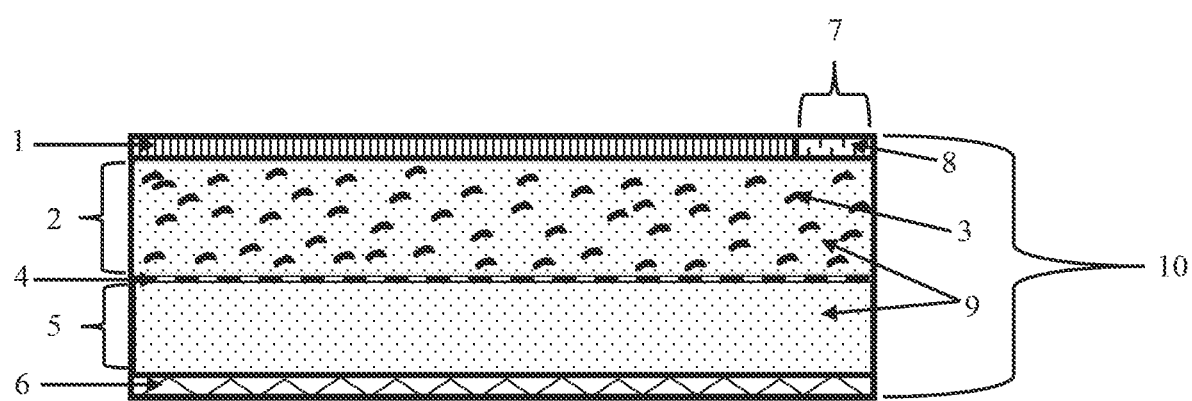
FIG. 6 is a cross sectional view example of flame retardant building construction material 10 with vermiculite ore 3 with synergistic flame retardant(s) 9 used in the top compound layer 2, side lap area 7, top surfacing 1 and side lap surfacing 8 applied to top compound layer 2, substrate 4, bottom compound layer 5 with added synergistic flame retardant(s) 9 and bottom surfacing 6 applied to the bottom compound layer 5.
Figure 9:
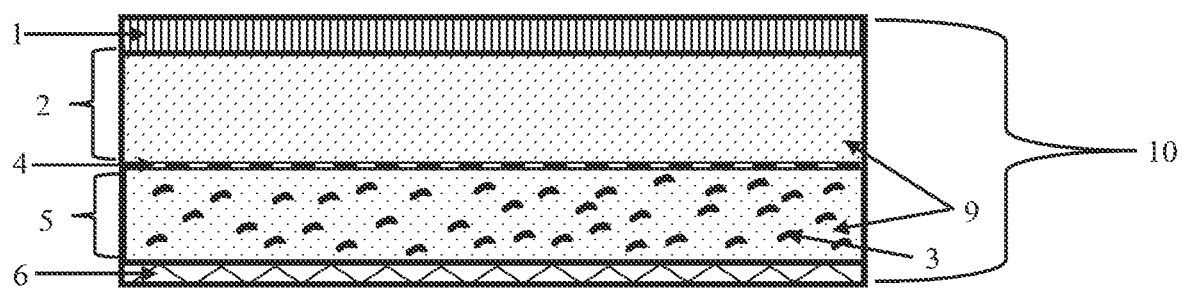
FIG. 9 is a cross sectional view example of flame retardant building construction material 10 with synergistic flame retardant(s) 9 used in top compound layer 2, top surfacing 1 applied to top compound layer 2, substrate 4, bottom compound layer 5 with vermiculite ore 3 used with synergistic flame retardant(s) 9 and bottom surfacing 6 applied to the bottom compound layer 5.
Figure 10:
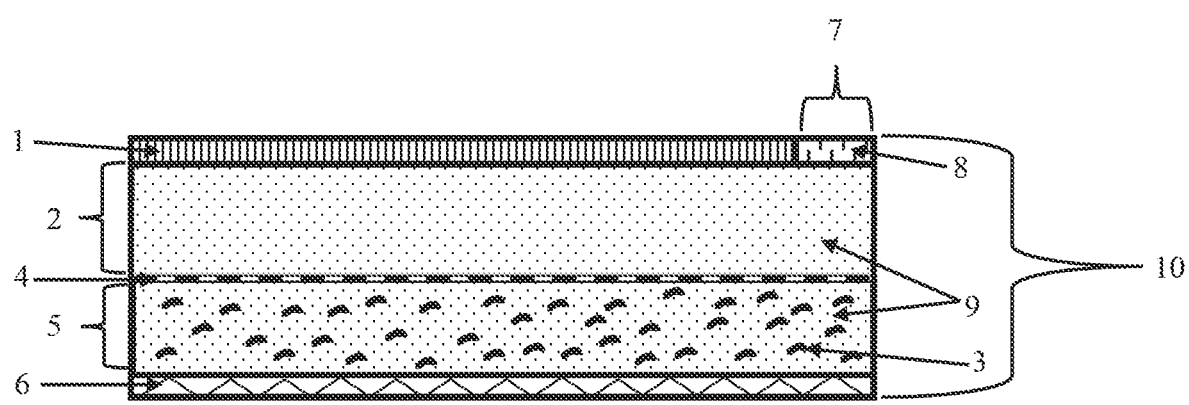
FIG. 10 is a cross sectional view example of flame retardant building construction material 10 with synergistic flame retardant(s) 9 used in the top compound layer 2, side lap area 7, top surfacing 1 and side lap surfacing 8 applied to top compound layer 2, substrate 4, bottom compound layer 5 with vermiculite ore 3 used with synergistic flame retardant(s) 9, and bottom surfacing 6 applied to the bottom compound layer 5.

In one or more embodiments, the compound in a side lap area 7 is the same asphaltic based compound type used to construct top compound 2 for ease of manufacturing. Sometimes an adhesive is applied in a side lap area 7 to enhance the bond with bottom compound layer 5 when the flame retardant building construction material is overlapped. In one or more embodiments, synergistic flame retardant 9 like Colemanite, Aluminum Trihydrate, Magnesium hydroxide, expanded vermiculite, expandable graphite, and the like, used alone and or in combinations thereof to name a few, can be used without vermiculite ore 3 in bottom compound layer 5 as seen in FIG. 5 and FIG. 6 as part of flame retardant building construction material 10. Alternately, synergistic flame retardant(s) 9 can be used without vermiculite ore 3 in top compound layer 2 as seen in FIG. 9 and FIG. 10 as part of flame retardant building construction material 10.

Figure 3:
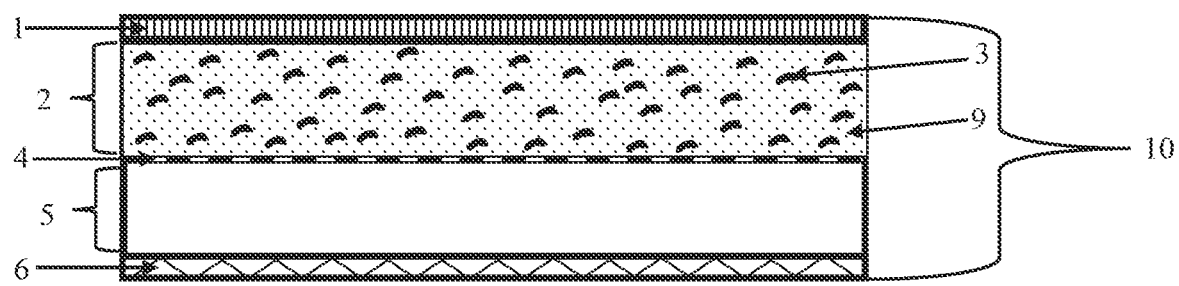
FIG. 3 is a cross sectional view example of flame retardant building construction material 10 with vermiculite ore 3 with synergistic flame retardant(s) 9 used in the top compound layer 2, top surfacing 1 applied to top compound layer 2, substrate 4, bottom compound layer 5 and bottom surfacing 6 applied to bottom compound layer 5.
Figure 4:
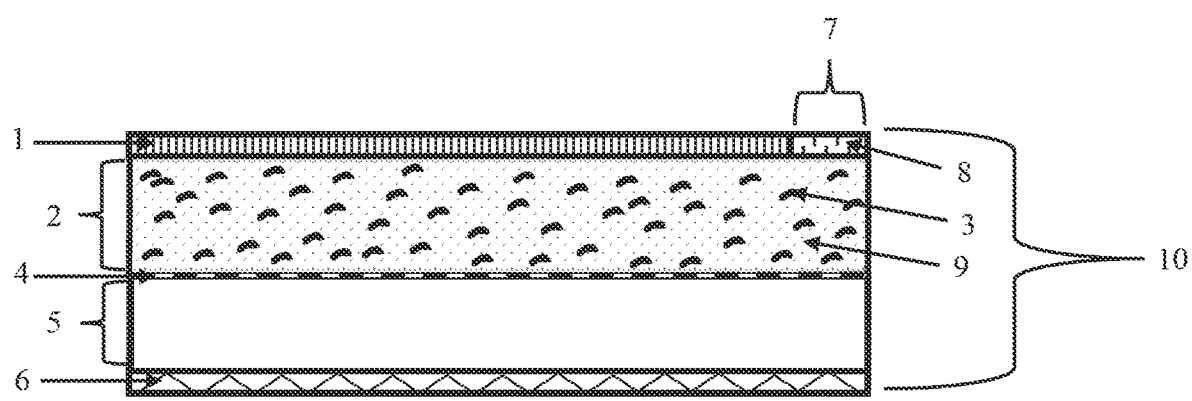
FIG. 4 is a cross sectional view example of flame retardant building construction material 10 with vermiculite ore 3 with synergistic flame retardant(s) 9 used in the top compound layer 2, side lap area 7, top surfacing 1 and side lap surfacing 8 applied to top compound layer 2, substrate 4, bottom compound layer 5 and bottom surfacing 6 applied to bottom compound layer 5.
Figure 7:
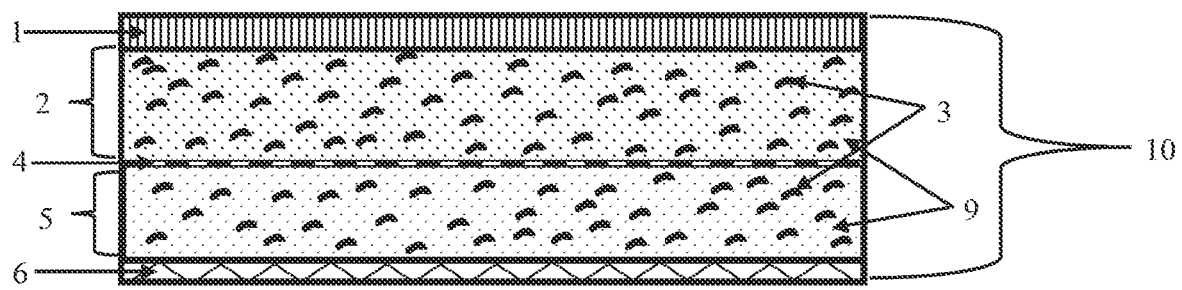
FIG. 7 is a cross sectional view example of flame retardant building construction material 10 with vermiculite ore 3 with synergistic flame retardant(s) 9 used in top compound layer 2, top surfacing 1 applied to top compound layer 2, substrate 4, bottom compound layer 5 with vermiculite ore 3 used with synergistic flame retardant(s) 9 and bottom surfacing 6 applied to the bottom compound layer 5.
Figure 8:
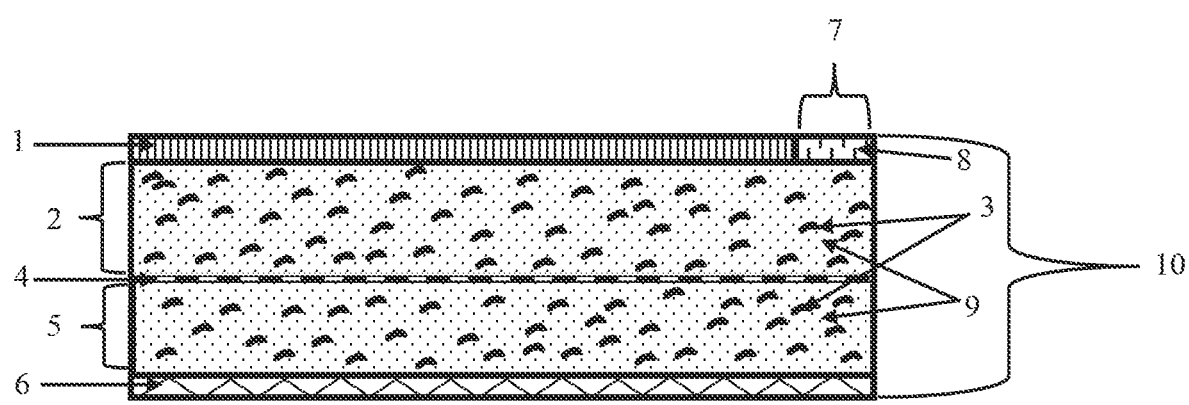
FIG. 8 is a cross sectional view example of a flame retardant building construction material 10 with vermiculite ore 3 with synergistic flame retardant(s) 9 used in top compound layer 2, side lap area 7, top surfacing 1 and side lap surfacing 8 applied to top compound layer 2, substrate 4, bottom compound layer 5 with vermiculite ore 3 used with synergistic flame retardant(s) 9 and bottom surfacing 6 applied to the bottom compound layer 5.
Figure 11:
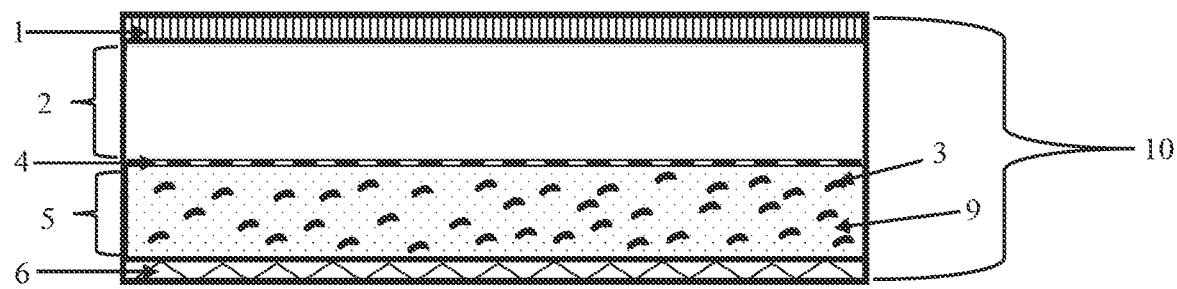
FIG. 11 is a cross sectional view example of flame retardant building construction material 10 with top surfacing 1 applied to top compound layer 2 without flame retardant(s), substrate 4, bottom compound layer 5 with vermiculite ore 3 used with synergistic flame retardant(s) 9, and bottom surfacing 6 applied to the bottom compound layer 5.
Figure 12:
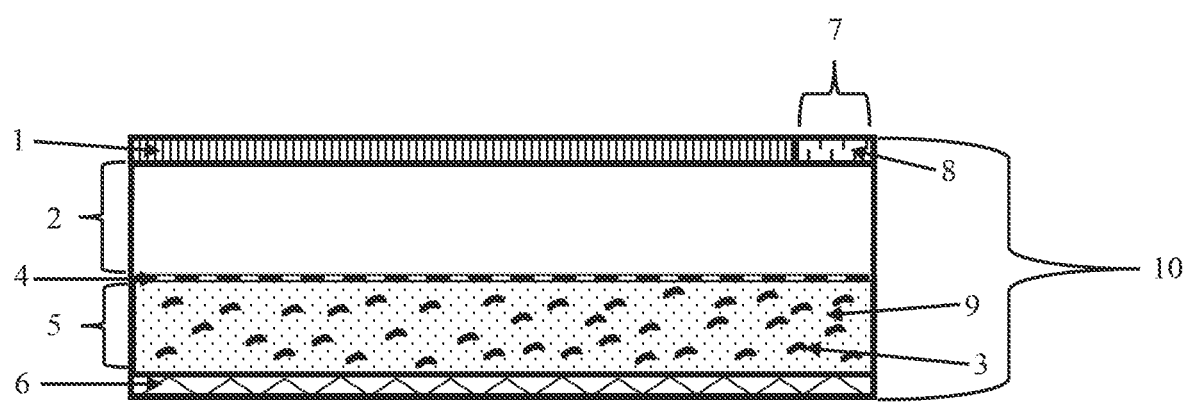
FIG. 12 is a cross sectional view example of flame retardant building construction material 10 with side lap area 7, top surfacing 1 and side lap surfacing 8 applied to top compound layer 2 without flame retardant(s), substrate 4, bottom compound layer 5 with vermiculite ore 3 used with synergistic flame retardant(s) 9, and bottom surfacing 6 applied to the bottom compound layer 5.

In one or more embodiments, synergistic flame retardant 9 is used in combination with vermiculite ore 3 in top compound layer 2 without additional flame retardant(s) being used in bottom compound layer 5 as seen in FIG. 3 and FIG. 4. In other embodiments, synergistic flame retardant 9 is used in combination with vermiculite ore 3 in bottom compound layer 5 with no additional flame retardant(s) being used in top compound layer 2 as seen in FIG. 11 and FIG. 12. In yet one or more embodiments, synergistic flame retardant 9 is used in combination with vermiculite ore 3 in both top compound layer 2 and also in bottom compound layer 5 as seen in FIG. 7 and FIG. 8.

Synergistic flame retardant 9 is typically added to top compound layer 2 prior to using top compound 2 as a layer on the production line. Vermiculite ore 3 used in top compound 2 as seen in FIGS. 3-8 can be added to top compound layer 2 along with synergistic flame retardant 9 prior to top compound layer 2 being applied on the production line or preferably vermiculite ore 9 can be added to top compound layer 2 on the production line prior to adding top surfacing 1 to flame retardant building construction material 10.

In other examples, synergistic flame retardant 9 and vermiculite ore 3 are incorporated into top compound layer 2 and synergistic flame retardant 9 is also added to bottom compound layer 5 as seen in FIG. 5 and FIG. 6. Synergistic flame retardant 9 is typically added to top compound 2 and bottom compound 5 prior to using the two compounds on the production line. Top compound 2 and bottom compound 5 can be the same compound type or be entirely different compounds altogether.

In one or more embodiments, vermiculite ore 3 used in top compound layer 2 can be added to top compound 2 along with synergistic flame retardant 9 prior to top compound layer 2 being applied on the production line or vermiculite ore 9 can be added to top compound 2 on the production line prior to adding top surfacing 1 to flame retardant building construction material 10.

Figure 13:
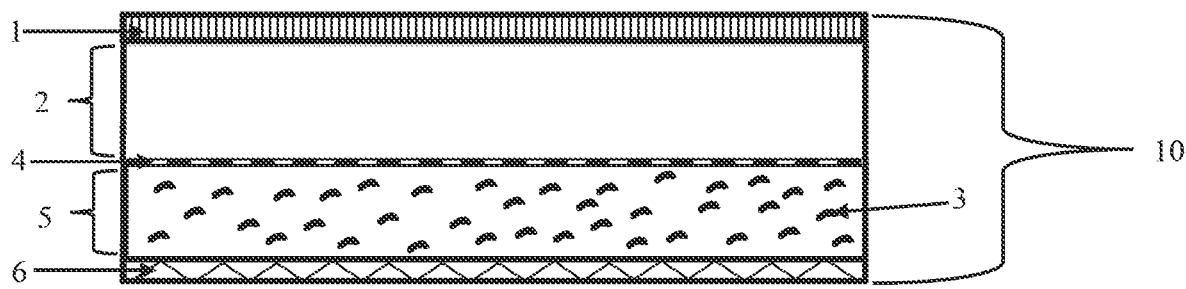
FIG. 13 is a cross sectional view example of flame retardant building construction material 10 with top surfacing 1 applied to top compound layer 2 without flame retardant(s), substrate 4, bottom compound layer 5 with vermiculite ore 3, and bottom surfacing 6 applied to the bottom compound layer 5.
Figure 14:
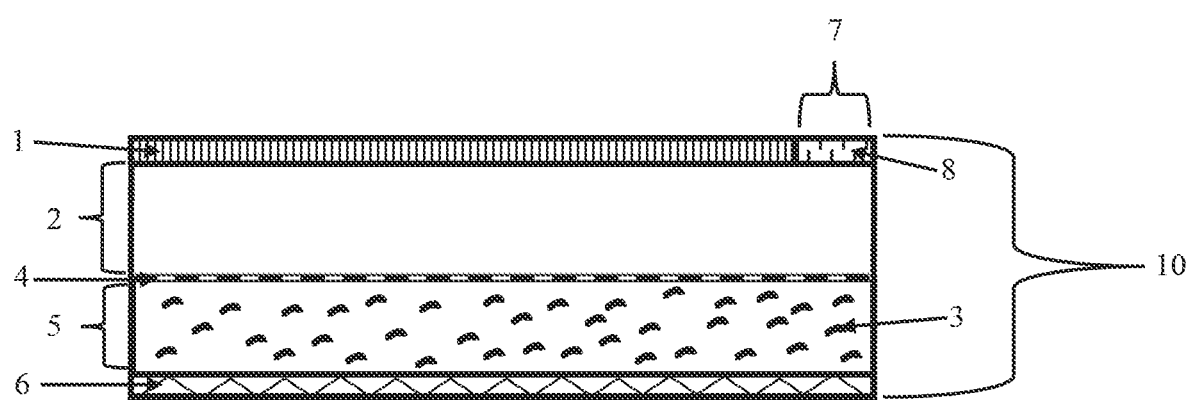
FIG. 14 is a cross sectional view example of flame retardant building construction material 10 with side lap area 7, top surfacing 1 and side lap surfacing 8 applied to top compound layer 2 without flame retardant(s), substrate 4, bottom compound layer 5 with vermiculite ore 3, and bottom surfacing 6 applied to the bottom compound layer 5.

In other examples, vermiculite ore 3 and synergistic flame retardant 9 are added to top compound layer 2 and also to bottom compound layer 5 of flame retardant building construction material 10 as seen in FIG. 7 and FIG. 8. In other examples, vermiculite ore 3 is used in bottom compound layer 5 with synergistic flame retardant 9 as seen in FIGS. 7-12 and in yet other examples vermiculite ore 3 and synergistic flame retardant 9 are used together in both the top compound layer 2 and bottom compound layer 5 as seen in FIG. 7 and FIG. 8. In yet other examples, vermiculite ore can be used alone in bottom compound 5 as seen in FIG. 13 and FIG. 14.

In the examples listed above, top compound layer 2 may consist of one or more asphaltic based compound layers and bottom compound 5 may consist of one or more layers of asphaltic based compound. Top compound layer 2 and/or bottom compound layer 5 may be comprised of the same type and composition, i.e. asphaltic compound(s), plastomeric and/or elastomeric modified bitumen compound(s) or combination thereof. Also top compound layer 2 and bottom compound layer 5 may be the same type of compound(s) but with different formulations or top compound layer 2 and bottom compound layer 5 may be different types of compound(s) and compositions entirely.

The disclosed flame retardant building construction material in these embodiments and examples is focused primarily on the use of vermiculite ore incorporated in the flame retardant building construction material with or without synergistic flame retardant(s) in one way or another. A preferred way to use the vermiculite ore is in the top compound layer alone. Alternate preferred methods include using the vermiculite ore with or without synergistic flame retardant(s) in either the top compound layer or layers or the bottom compound layer or layers or used in multiple compound layers as desired. The use of vermiculite ore is of importance and is the novel idea being disclosed and not the type of compound used or the use of other materials and/or other ingredients used in the formula to manufacture the flame retardant building construction material.

The vermiculite ore disclosed in the examples is a naturally occurring mineral that expands when heated. Technically, vermiculite ore encompasses a large group of hydrated laminar magnesium-aluminum-iron silicates, which resemble mica. There are two keys to the unique properties of vermiculite. The first is its laminar (or layered) crystalline structure, which provides the hinged plates that make the material expand or unfold in a linear manner. The second is the fact that it contains trapped water, which flashes into steam when heated to force the layers open. It has been discovered that when the vermiculite ore is at a certain critical concentration, the vermiculite ore fuses, forming a crystal like continuous layer when exposed to temperatures of 1200° C. or higher, when used alone or in combination with other inorganic or organic materials and/or compounds. The release of trapped water combined with the crystalline layer structure gives vermiculite its flame retardant characteristics.

The vermiculite ore used in the embodiments and examples is added to and/or incorporated into thermoplastic, elastomeric, asphaltic and or modified bitumen compounds to make flame retardant building construction materials with or without a synergistic flame retardant like Colemanite. When these flame retardant building construction materials are tested by Underwriters Laboratory (UL) using the UL 790 (ASTM E-108) test method they pass a Class A rating that is the highest rating obtainable over combustible and noncombustible decks. It was observed during testing of the disclosed flame retardant building construction material by using the UL 790 test method that the vermiculite ore released trapped water and formed a protective crust like shield over the surface of the flame retardant building construction material that prevented the flames from spreading and penetrating the flame retardant building construction material.

The flame retardant building construction material disclosed can be used anywhere on a building structure, on the top or side of a building or roof deck alone or in combination with other building construction materials, it can be used as an underlayment under other roofing, siding, flooring and building envelope materials including metal panels, tiles and the like or as a final roof, siding, blindside waterproofing, floor and/or building envelope covering alone to name a few.

The vermiculite ore used in the disclosed flame retardant building construction material is also identified as untreated vermiculite with a CAS-No. 1318-00-9. It has a specific gravity between 2 and 3 with a preferred specific gravity between 2.4 and 2.8, a bulk density between 40-60 lbs/ft$^3$ (640-1041 Kg/m$^3$) and a pH of 6-8. The vermiculite ore also has a granulometry or sieve grading between 0.1 and 2.4 mm as seen in Table 1 below. It should be noted that all 3 grades of vermiculite ore shown in Table 1 are viable examples that have been and can be used in the disclosed flame retardant building construction material with or without a synergistic flame retardant(s) that passed UL 790 flame testing to achieve the Class A, B or C ratings as desired for the disclosed flame retardant building construction material. The use of a finer particle size and/or ground vermiculite ore is also incorporated in this disclosure.

TABLE 1

% Weight Retained on each screen

| U.S. Screens | mm | Vermiculite Grade | | |
| --- | --- | --- | --- | --- |
| | | VCX 203 | VCX 204 | VCX 205 |
| 8 | 2.36 | — | — | — |
| 12 | 1.70 | 0-10 | — | — |
| 16 | 1.18 | 10-35 | — | — |
| 20 | 0.85 | 25-40 | — | — |
| 30 | 0.60 | 20-40 | — | 0-1 |
| 40 | 0.425 | 2-14 | 24-40 | — |
| 50 | 0.30 | 0-8 | 24-38 | 0-20 |

TABLE 1-continued

| | | % Weight Retained on each screen | | |
|---|---|---|---|---|
| U.S. Screens | mm | VCX 203 | Vermiculite Grade VCX 204 | VCX 205 |
| 70 | 0.212 | 0-7 | 10-20 | — |
| 100 | 0.15 | — | 0-15 | 30-76 |
| −100 pan | <0.15 | — | — | — |

The sieve size of the vermiculite ore used is typically larger than other inorganic fillers and flame retardants used for similar purposes in thermoplastic, elastomeric, asphaltic, and or modified bitumen flame retardant building construction materials. This larger size limits the amount one can add to the compound prior to processing the material on the production line. Limestone used for a filler for example is much finer and typically most if not all of the limestone will pass through a 100 US sieve and has been used in amounts up to 75% in asphaltic shingle products. Colemanite that is also much finer than the disclosed unexpanded vermiculite for example and also typically passes completely through a US 100 sieve has been used in compounds up to 50% in flame retardant building construction materials as disclosed by Grube et al., in U.S. Pat. No. 5,055,135.

The vermiculite ore with a sieve grading greater than a US 100 sieve size grading used in the disclosed flame retardant building construction material can be added from about 5-55% by weight to various compounds like asphaltic or modified bitumen compound prior to processing the compound on the production line with or without additional synergistic flame retardants, with or without other inorganic fillers and additives like oils, tackifiers, polymers etc. and pass the UL Class A fire rating.

It has been discovered in a preferred embodiment that adding the vermiculite ore to the hot thermoplastic compound, hot elastomeric compound, hot asphaltic compound, or hot modified bitumen compounds during manufacturing of the flame retardant building construction material on the production line is the preferred and easiest way to process the vermiculite ore into the flame retardant building construction material. The vermiculite ore has a high specific gravity and when dropped from above using a standard sand or granule applicator prior to and/or after the addition of one or more top surfacing layers, allows the vermiculite ore to sink into the compound to various degrees depending on the height of the applicator, the temperature of the compound and the thickness of the compound it is applied onto.

The preferred process for manufacturing flame retardant building construction material 10 using vermiculite ore 3 incorporated into the flame retardant building construction material 10 is as follows:

1. Blend and make compound(s) as needed for flame retardant building construction material 10 as is normally done in production including additives and fillers as desired prior to application on the manufacturing line.
2. Add optional synergistic flame retardant(s) 9 to compound(s) as desired and mix until incorporated.
3. Transfer compound(s) to the production line when compound(s) is at the desired temperature(s) and use the compound(s) as part of or as the entire top compound layer 2, or in part of or as the entire bottom compound layer 5 or in both top and bottom compound layers as desired.
4. The hot compound(s) with or without optional synergistic flame retardant(s) 9 are applied in layers as desired to substrate 4 in one or more steps and is calendared or scraped to saturate substrate 4 and obtain a desired thickness.
5. Vermiculite ore 3 is then applied to the hot top compound layer 2 on saturated substrate 4 by dropping and depositing vermiculite ore 3 onto hot top compound layer 2 using a standard applicator for applying sand and or granules to a construction material.
6. Additional layer(s) of top compound layer 2 with or without optional synergistic flame retardant(s) 9, can be applied onto previously applied top compound layer 2 as desired.
7. Vermiculite ore 3 can be dropped onto additional top compound layer(s) 2 as desired or used as top surfacing 1.
8. Bottom compound layer(s) 5 with or without synergistic flame retardant(s) 9, with or without vermiculite ore 3, is applied to the bottom of substrate 4.
9. Flame retardant building construction material 10 is calendared to the desired thickness.
10. Side lap adhesive, compound, and/or self-adhered compound can be applied in optional side lap area 7.
11. Optional top surfacing 1 and optional side lap surfacing 8 can be applied to the top compound layer 2 as desired.
12. Bottom surfacing 6 is applied as desired to the bottom compound layer 5.
13. Flame retardant building construction material 10 is cooled and cut to the desired length and packaged as desired.

The processes mentioned above can be altered by adding vermiculite ore 3 to the compound(s) prior to manufacturing on the production line. The disclosed process serves only as a guideline in order to manufacture the disclosed flame retardant building construction material 10. Alterations to the process are incorporated herein to maintain the spirit of the disclosed invention.

Also, vermiculite ore 3 can be used as top surfacing 1 or bottom surfacing 6 as desired alone or with other surfacings or become incorporated into flame retardant building construction material 10 in the manner described above prior to adding a top or bottom surfacing like a polymeric film for example. It has been discovered that up to 90% by weight of vermiculite ore can be dropped onto the hot asphalt and/or modified bitumen compound(s) on the production line for the desired compound layer.

Vermiculite ore at a preferred weight percent of 10-60% can be used in a single compound layer with or without a synergistic flame retardant(s) for the flame retardant building construction material and pass UL 790 Class A fire rating.

The vermiculite ore can be dropped onto one or more compound layers as desired or needed. For example, the vermiculite ore can be dropped across the entire top compound layer or entire bottom compound layer or both compound layers. In another example the vermiculite ore can be dropped onto the desired compound layer(s) in distinct strips, bands, zones, and or sections. In yet another example the vermiculite ore can be dropped onto the top compound layer without dropping the vermiculite ore in the side lap area of the top compound layer.

The amount of vermiculite ore dropped onto the compound layer can vary depending on several factors including:

1. Amount of optional vermiculite ore added to the compound or compounds prior to processing the compound(s) on the production line for use in one or more compound layers to manufacture the flame retardant building construction material.
2. Amount of optional synergistic flame retardant(s) added to the compound or compounds prior to processing the compound(s) on the production line for use in one or more compound layers to manufacture the flame retardant building construction material.
3. Amount of optional vermiculite ore and amount of optional synergistic flame retardant added alone or together to the compound or compounds prior to processing the compound(s) on the production line for use in one or more compound layers to manufacture the flame retardant building construction material.

In one embodiment, it has been discovered that a single layer of a flame retardant building construction material or membrane under steel metal panels, tiles, shingles, or the like can be used as a combined flame barrier and water and/or vapor and/or air barrier, achieves a Class A fire rating as tested by UL 790 criteria. The single ply of the flame retardant building construction material or membrane used to pass the UL 790 Class A fire testing has a total thickness of 1.0-3.5 mm, with a preferred total thickness of 2.0-2.5 mm, uses 10-90% by weight of vermiculite ore in the top compound layer only, uses a tacky self-adhered elastomeric bottom compound layer at a thickness of 0.2-0.6 mm, with a preferred bottom compound thickness layer of 0.3-0.5 mm, without synergistic flame retardant(s) used in either the top or bottom compound layer(s) to make the flame retardant building construction material or membrane.

The top compound layer with vermiculite ore, with or without added synergistic flame retardant(s), acts as the flame barrier. The tacky elastomeric self-adhered bottom compound layer, with or without added synergistic flame retardant(s), is used for the vapor and/or water and/or air barrier. This single ply flame retardant building construction material or membrane protects the structure from fire, vapor, air, and water intrusion.

For example, the single ply flame retardant building construction material or membrane used to pass UL Class A 790 fire tests under metal panels comprises a glass mat as the substrate, a polymeric film as a top surfacing and a release liner treated with silicone as the bottom surfacing that is removed prior to installation.

The need for additional flame retardants in the top compound layer or subsequent compound layers can be reduced and or eliminated since a large percentage of vermiculite ore can be dropped onto the desired compound layer(s) during manufacturing. This simplifies the manufacturing of flame retardant building construction materials or membranes that need to achieve a fire rating classification like UL 790 Class A, B, or C fire rating. These fire ratings are often desired by building owners and are often required by code bodies in the industry.

FIGS. 1-26 disclose asphaltic and/or modified bitumen flame retardant building construction materials used as cap sheets or membranes that are exposed to the elements, used as base sheets or membranes, used as underlayments, used as vapor, air, water and sound barriers, used as waterproofing, or used as ply sheets or membranes. These flame-retardant building construction materials or membranes can be manufactured so that they pass a Class A, B or C UL 790 fire test rating when used alone or used in various combinations, particularly when vermiculite ore is used in the thermoplastic, elastomeric, asphaltic, and/or modified bitumen compound layer(s), with or without a synergistic flame retardant(s), used in one or more compound layers as shown in FIGS. 1-26.

The amount of vermiculite ore used with or without synergistic flame retardant(s) in one or more layers in the flame retardant building construction material to obtain a UL 790 Class A, B, or C fire test rating, will vary by how and what the flame retardant building construction material is used for, how many layers of material is desired, what the manufacturers' warranty calls for, and if the deck or structure is combustible or if the deck or structure is non-combustible to name a few.

The flame retardant building construction materials disclosed in Drawings 1-26, range in thickness from 0.5-5.5 mm and can be produced easily and economically as described previously. Guideline examples for the manufacturing of flame retardant building construction materials or membranes using vermiculite ore with or without synergistic flame retardants is listed below. It should be noted that the top compound layer 2 is defined as the layer or layers located above substrate 4 or carrier used to move the material through a production line, bottom compound layer 5 is defined as the layer or layers located below substrate 4 or carrier used to move the material through the production line. Also, some flame retardant building construction materials may have single or multiple compound layers located only above the substrate or carrier and some flame retardant building construction materials may have single or multiple compound layers located only below the substrate or carrier. These flame retardant building construction materials are incorporated herein.

Figure 15:
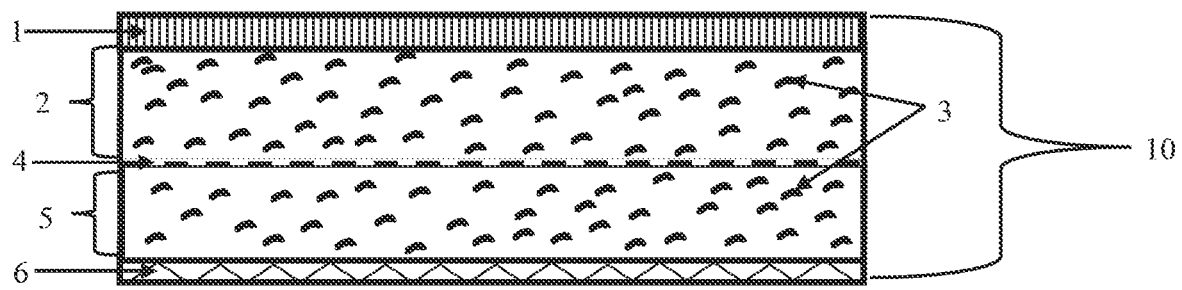
FIG. 15 is a cross sectional view example of flame retardant building construction material 10 with vermiculite ore 3 used in top compound layer 2, top surfacing 1 applied to top compound layer 2, substrate 4, bottom compound layer 5 with vermiculite ore 3, and bottom surfacing 6 applied to the bottom compound layer 5.
Figure 16:
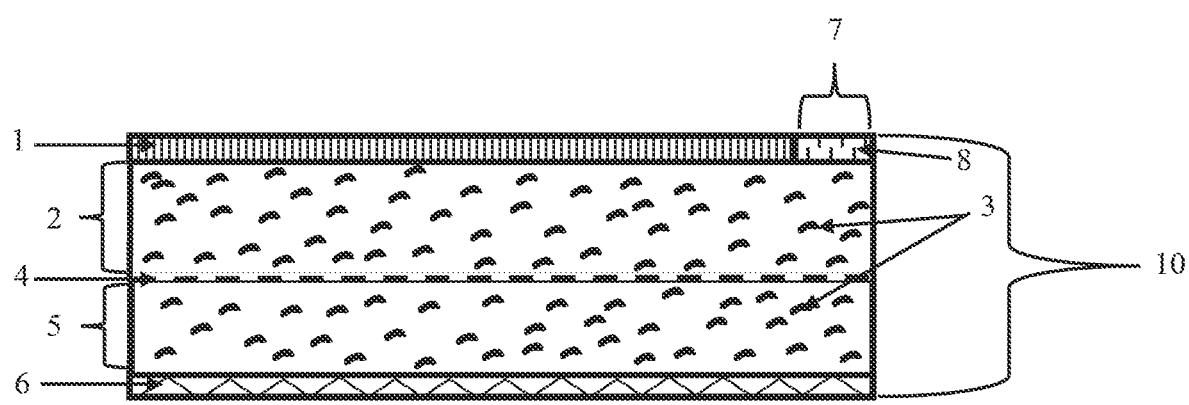
FIG. 16 is a cross sectional view example of flame retardant building construction material 10 with vermiculite ore 3 with synergistic flame retardant(s) 9 used in top compound layer 2, side lap area 7, top surfacing 1 and side lap surfacing 8 applied to top compound layer 2, substrate 4, bottom compound layer 5 with vermiculite ore 3 used with synergistic flame retardant(s) 9 and bottom surfacing 6 applied to the bottom compound layer 5.

Examples for those trained in the art that compound and manufacture fire retardant building construction materials, these ranges are included as a starting point guideline but are not limited to:

1. 10-90% by weight of vermiculite ore in top compound layer without synergistic flame retardant(s) being used in any layer as demonstrated in FIG. 1 and FIG. 2.
2. 1-70% by weight of vermiculite ore used in combination with 1-50% by weight of synergistic flame retardant(s) in top compound layer without flame retardant(s) used in bottom compound layer as demonstrated in FIG. 3 and FIG. 4.
3. 1-70% by weight of vermiculite ore used in combination with 1-50% by weight of synergistic flame retardant(s) in top compound layer with 1-50% by weight of synergistic flame retardant(s) used in bottom compound layer as demonstrated in FIG. 5 and FIG. 6.
4. 1-70% by weight of vermiculite ore used in combination with 1-50% by weight of synergistic flame retardant(s) in top compound layer with 1-70% by weight of vermiculite ore used in combination with 1-50% by weight of synergistic flame retardant(s) in bottom compound layer as demonstrated in FIG. 7 and FIG. 8.
5. 1-50% by weight of synergistic flame retardant(s) used in the top compound layer with 1-70% by weight of vermiculite ore used in combination with 1-50% by weight of synergistic flame retardant(s) in bottom compound layer as demonstrated in FIG. 9 and FIG. 10.
6. 1-70% by weight of vermiculite ore used in combination with 1-50% by weight of synergistic flame retardant(s) in bottom compound layer without flame retardants(s) used in top compound layer as demonstrated in FIG. 11 and FIG. 12.
7. 10-90% by weight of vermiculite ore used in bottom compound layer without added synergistic flame retardant(s) used in any layer as demonstrated in FIG. 13 and FIG. 14.
8. 1.0-70% by weight of vermiculite ore used in top compound layer with 1.0-70% by weight of vermiculite ore used in bottom compound layer without synergistic flame retardant(s) used in any layer as demonstrated in FIG. 15 and FIG. 16.

Figure 17:
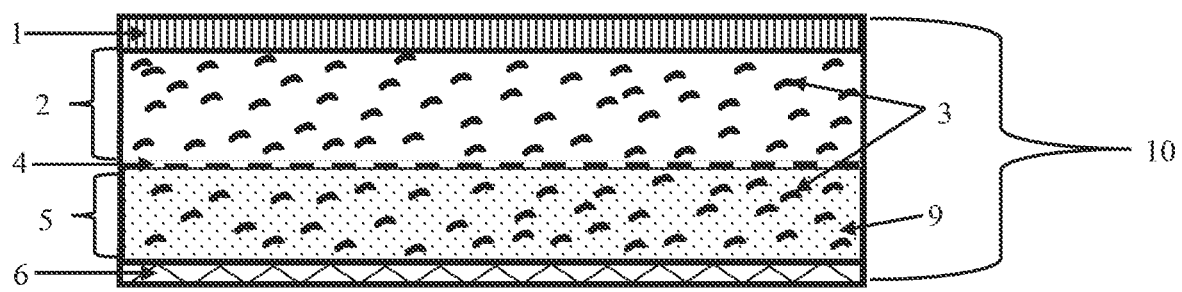
FIG. 17 is a cross sectional view example of flame retardant building construction material 10 with vermiculite ore 3 used in top compound layer 2, top surfacing 1 applied to top compound layer 2, substrate 4, bottom compound layer 5 with vermiculite ore 3 used with synergistic flame retardant(s) 9 and bottom surfacing 6 applied to the bottom compound layer 5.
Figure 18:
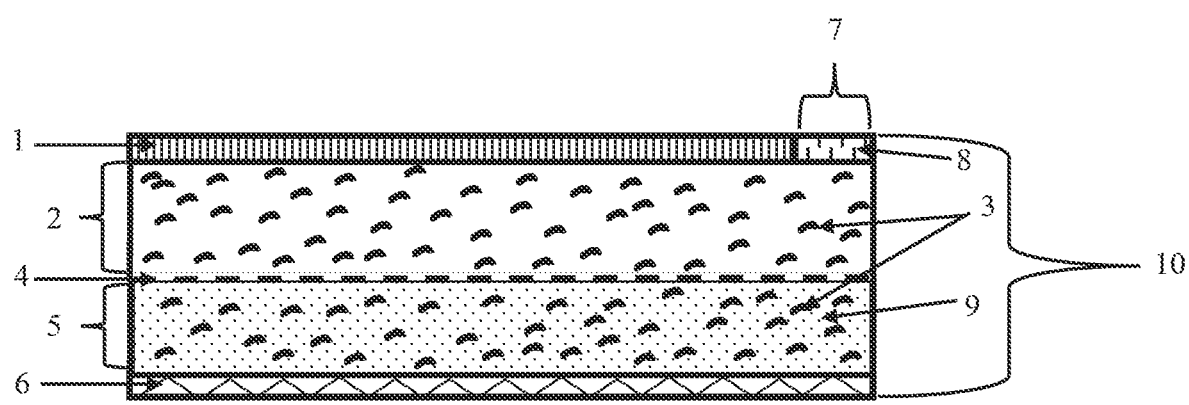
FIG. 18 is a cross sectional view example of flame retardant building construction material 10 with vermiculite ore 3 used in top compound layer 2, side lap area 7, top surfacing 1 and side lap surfacing 8 applied to top compound layer 2, substrate 4, bottom compound layer 5 with vermiculite ore 3 used with synergistic flame retardant(s) 9 and bottom surfacing 6 applied to the bottom compound layer 5.

9. 1.0-70% by weight of vermiculite ore used in top compound layer without synergistic flame retardant(s) with 1-50% by weight of vermiculite ore used in combination with 1-50% by weight of synergistic flame retardant(s) in bottom compound layer as demonstrated in FIG. 17 and FIG. 18.

Figure 19:
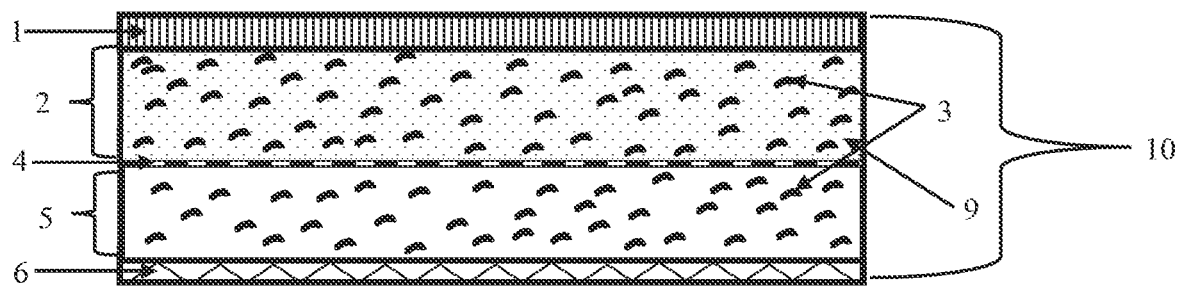
FIG. 19 is a cross sectional view example of flame retardant building construction material 10 with vermiculite ore 3 with synergistic flame retardant(s) 9 used in top compound layer 2, top surfacing 1 applied to top compound layer 2, substrate 4, bottom compound layer 5 with vermiculite ore 3, and bottom surfacing 6 applied to the bottom compound layer 5.
Figure 20:
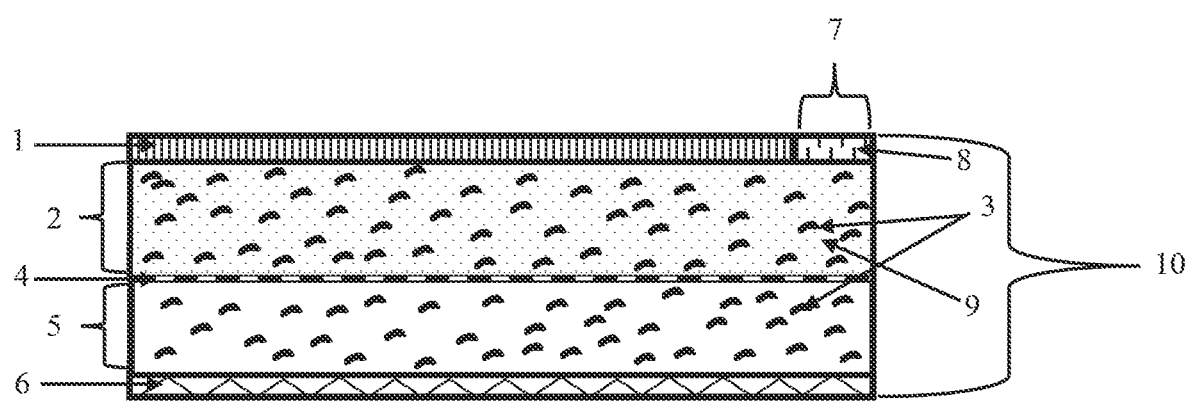
FIG. 20 is a cross sectional view example of flame retardant building construction material 10 with vermiculite ore 3 with synergistic flame retardant(s) 9 used in top compound layer 2, side lap area 7, top surfacing 1 and side lap surfacing 8 applied to top compound layer 2, substrate 4, bottom compound layer 5 with vermiculite ore 3, and bottom surfacing 6 applied to the bottom compound layer 5.

10. 1-50% by weight of vermiculite ore used in combination with 1-50% by weight of synergistic flame retardant(s) in top compound layer with 1.0-70% by weight of vermiculite ore used without synergistic flame retardant(s) in bottom compound layer as demonstrated in FIG. 19 and FIG. 20.

Figure 21:
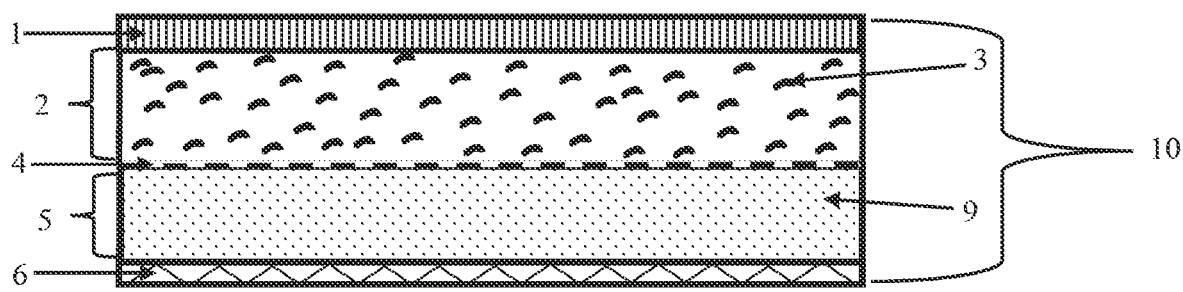
FIG. 21 is a cross sectional view example of flame retardant building construction material 10 with vermiculite ore 3 used in top compound layer 2, top surfacing 1 applied to top compound layer 2, substrate 4, bottom compound layer 5 with synergistic flame retardant(s) 9 and bottom surfacing 6 applied to the bottom compound layer 5.
Figure 22:
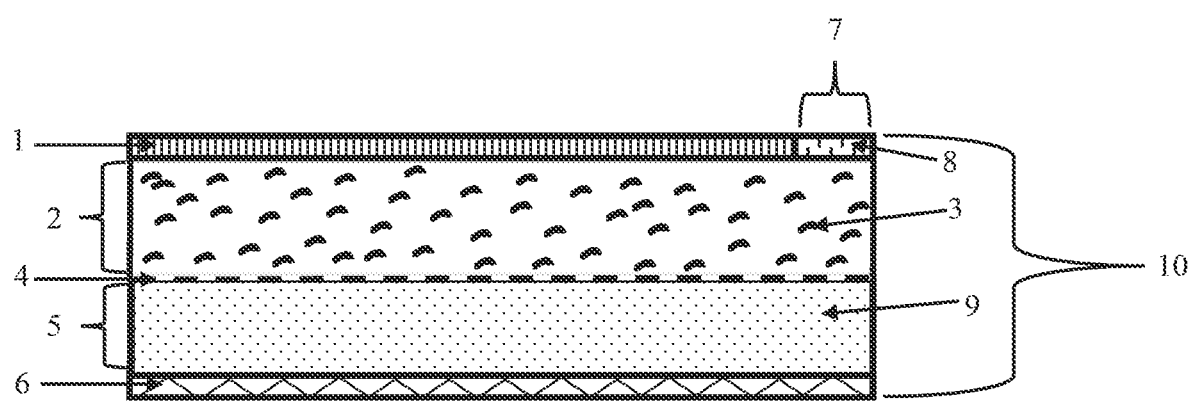
FIG. 22 is a cross sectional view example of flame retardant building construction material 10 with vermiculite ore 3 used in top compound layer 2, side lap area 7, top surfacing 1 and side lap surfacing 8 applied to top compound layer 2, substrate 4, bottom compound layer 5 with synergistic flame retardant(s) 9, and bottom surfacing 6 applied to the bottom compound layer 5.

11. 10-90% by weight of vermiculite ore used without synergistic flame retardant(s) in top compound layer with 1-50% by weight of synergistic flame retardant(s) used in the bottom compound layer as demonstrated in FIG. 21 and FIG. 22.

Figure 23:
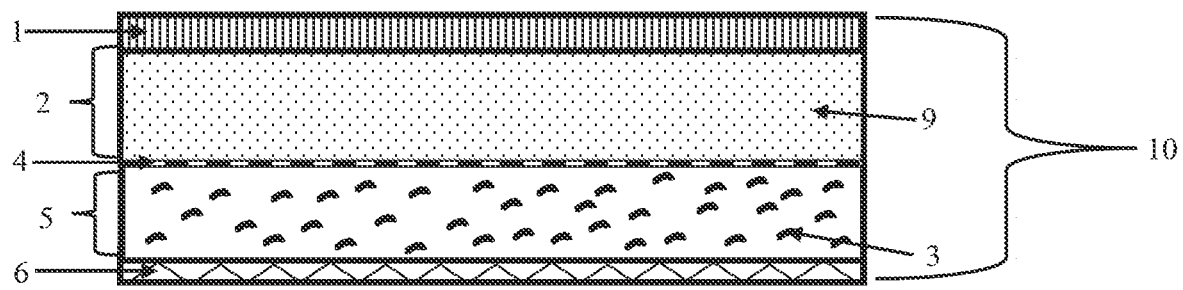
FIG. 23 is a cross sectional view example of flame retardant building construction material 10 with synergistic flame retardant(s) 9 used in top compound layer 2, top surfacing 1 applied to top compound layer 2, substrate 4, bottom compound layer 5 with vermiculite ore 3, and bottom surfacing 6 applied to the bottom compound layer 5.

12. 1-50% by weight of synergistic flame retardant(s) used in top compound layer with 10-90% by weight of vermiculite ore used in bottom compound layer as demonstrated in FIG. 23 and FIG. 24.

Fire resistant building construction materials or membranes that use vermiculite ore as a flame retardant, with or without synergistic flame retardant(s), in one or more compound layers, is easy to manufacture, is lower in cost compared to traditional flame retardants currently used in the industry, is environmentally friendly and is an economical and environmentally friendly solution to the problems stated previously. The use of vermiculite ore, with or without synergistic flame retardant(s), used alone in one compound layer, further reduces the overall cost of the flame resistant building construction material or membrane and can achieve a UL 790 Class A rating in various roof systems including under a metal panel roof in a single layer as one example.

In one embodiment the building construction material includes a minimum of 2 layers including at least one compound layer and one substrate or carrier layer, with vermiculite ore incorporated in at least one of the layers.

In another embodiment the building construction material includes a second compound layer with one compound layer is a top layer and one compound layer is a bottom compound layer with vermiculite ore incorporated in at least one of the layers.

Many other embodiments are possible related to the material used in the layers of the building construction material. For example, one or more of these compounds can be used: an asphaltic compound, a polymer modified asphalt compound, a thermoplastic polymer compound, an elastomeric polymer compound.

In another embodiment at least one layer can include a combination of at least 2 of the following compounds: an asphaltic compound, a modified asphalt compound, a thermoplastic compound, an elastomeric compound.

The vermiculite ore can be added into one or more layers prior to incorporation into the building construction material. Or the vermiculite ore can be added into one or more layers during the manufacturing process of the building construction material.

The vermiculite ore can be deposited directly on the substrate.

One embodiment of the process to create the disclosed building construction material includes:

selecting a building construction material comprising: a minimum of 2 layers, at least one compound layer, at least one substrate layer, and vermiculite ore incorporated in at least one of the layers;
selecting the number of layers to be incorporated into the building construction material;
selecting at least one compound for each layer of the building construction material;
selecting a substrate that has a top side and a bottom side;
blending one or more selected compounds including additives and fillers as desired prior to application on a manufacturing line;
deciding if a synergistic flame retardant will be included into at least one selected compound and mixing selected synergistic flame retardant until incorporated into the selected compound;
applying selected compound onto at least one side of the substrate on the manufacturing line for a selected layer when the selected compound is at a desired temperature;
calendaring the selected compound layer to obtain a desired thickness so that the substrate is at least partially saturated;
applying vermiculite ore to the selected compound layer by depositing vermiculite ore onto the selected compound layer using an applicator;
applying a surfacing as desired; and
cooling, cutting, and packaging the building construction material to a desired length.

Another embodiment of the process to create the disclosed building construction material includes adding compound to the side lap area; and applying a surfacing to the side lap area. The vermiculite ore can also be applied as a surfacing. And the vermiculite ore can be added to additional compound layers prior to processing on the manufacturing line.

Another embodiment of the process to create the disclosed building construction material further includes: adding at least one additional layer onto the building construction material; applying a selected compound layer onto an opposite side of the substrate;
calendaring the building construction material to saturate the substrate to a desired thickness; and applying a surfacing to compound layer on the opposite side of the substrate layer.

Vermiculite ore can also be applied to at least one more additional compound layer. In one embodiment the process for manufacturing a building construction material according to includes adding a compound layer to at least one side lap area; and applying a surfacing to the side lap area as desired.

The process can include applying the vermiculite ore as a surfacing. And the vermiculite ore can be applied to at least one compound layer prior to processing on the manufacturing line. Having described preferred embodiments which serve to illustrate various concepts, structures and techniques which are the subject of this patent, it will now become apparent to those of ordinary skill in the art that other embodiments incorporating these concepts, structures, and techniques may be used. Accordingly, it is submitted that that scope of the patent should not be limited to the described embodiments but rather should be limited only by the spirit and scope of the following claims.

We claim:

1. A building construction material comprising:
a top compound layer;
a bottom compound layer:
a substrate layer; and
unexpanded vermiculite ore incorporated in at least one of the top and bottom compound layers;

wherein the building construction material achieves a Class A fire rating as tested by UL 790 criteria.

2. The building construction material according to claim 1, wherein an asphaltic compound is included in at least one of the top and bottom compound layers.

3. The building construction material according to claim 1, wherein a polymer modified asphalt compound is included in at least one of the top and bottom compound layers.

4. The building construction material according to claim 1, wherein a thermoplastic polymer compound is included in at least one of the top and bottom compound layers.

5. The building construction material according to claim 1, wherein an elastomeric polymer compound is included in at least one of the top and bottom compound layers.

6. The building construction material according to claim 1, wherein at least one of the top and bottom compound layers includes a combination of at least two of following compounds: an asphaltic compound, a modified asphalt compound, a thermoplastic compound, and an elastomeric compound.

7. The building construction material according to claim 1, wherein the building construction material has a thickness between 0.5-5.5 mm.

8. The building construction material according to claim 1, wherein the unexpanded vermiculite ore is between 5-90% by weight of at least one of the top and bottom compound layers.

9. The building construction material according to claim 1, wherein the unexpanded vermiculite ore is incorporated into the at least one of the top and bottom compound layers during a manufacturing process of the building construction material.

10. A building construction material comprising:
   a top compound layer;
   a bottom compound layer:
   a substrate layer;
   unexpanded vermiculite ore incorporated in at least one of the top and bottom compound layers; and
   synergistic flame retardant in at least one of the top and bottom compound layers.

11. The building construction material according to claim 1, further comprising filler in at least one of the top and bottom compound layers.

12. The building construction material according to claim 1, wherein the unexpanded vermiculite ore is between a range of 5-90% by weight of the substrate layer.

13. A process for manufacturing a building construction material, the process comprising:
   depositing unexpanded vermiculite ore directly on a substrate layer;
   applying top and bottom compound layers onto top and bottom sides, respectively, of the substrate layer, wherein applying the top and bottom compound layers incorporates the unexpanded vermiculite ore in at least one of the top and bottom compound layers;
   wherein the building construction material achieves a Class A fire rating as tested by UL 790 criteria.

14. The process according to claim 13, wherein the building construction material comprises at least one side lap area.

15. The process according to claim 14, further comprising:
   adding compound to the side lap area; and
   applying a surfacing to the side lap area.

16. The process according to claim 13, further comprising applying the unexpanded vermiculite ore as a surfacing.

17. The process according to claim 13, further comprising adding a synergistic flame retardant in at least one of the top and bottom compound layers.

18. The building construction material according to claim 1, wherein the unexpanded vermiculite ore incorporated in both of the top and bottom compound layers.

19. The building construction material according to claim 10, further comprising synergistic flame retardant in both of the top and bottom compound layers.

20. The building construction material according to claim 19, wherein the synergistic flame retardant includes Colemanite, Aluminum Trihydrate, Magnesium hydroxide, expanded vermiculite, and/or expandable graphite.

21. The building construction material according to claim 10, wherein the synergistic flame retardant includes Colemanite, Aluminum Trihydrate, Magnesium hydroxide, expanded vermiculite, and/or expandable graphite.

22. The building construction material according to claim 1, wherein the unexpanded vermiculite ore is incorporated in at least the bottom compound layer.

23. A building construction material according to claim 1, comprising:
   a top compound layer;
   a bottom compound layer:
   a substrate layer; and
   unexpanded vermiculite ore incorporated in at least one of the top and bottom compound layers, wherein the unexpanded vermiculite ore has a specific gravity between 2 and 3.

24. The building construction material according to claim 23, wherein the unexpanded vermiculite ore has a specific gravity between 2.4 and 2.8, a bulk density between 40-60 lbs/ft$^3$ and a pH between 6 and 8.

25. The building construction material according to claim 23, wherein the building construction material achieves a Class A fire rating as tested by UL 790 criteria.

26. The building construction material according to claim 1, wherein the substrate layer is saturated with asphalt or modified bitumen, and the unexpanded vermiculite ore was deposited directly on the saturated substrate layer.

27. The building construction material according to claim 1, wherein the unexpanded vermiculite ore incorporated in the at least one of the top and bottom compound layers was deposited directly on the substrate layer.

28. The building construction material according to claim 10, wherein the unexpanded vermiculite ore incorporated in the at least one of the top and bottom compound layers was deposited directly on the substrate layer.

29. The building construction material according to claim 23, wherein the unexpanded vermiculite ore incorporated in the at least one of the top and bottom compound layers was deposited directly on the substrate layer.

30. The building construction material according to claim 23, wherein the unexpanded vermiculite ore has a sieve grading between 0.1 and 2.4 mm.

* * * * *